United States Patent Office

3,845,223
Patented Oct. 29, 1974

3,845,223
FROZEN CONFECTION STABILIZER SYSTEMS
John R. Moneymaker, Overland Park, and Maurice C. Meyer, Kansas City, Kans., assignors to Top-Scor Products, Inc., Kansas City, Kans.
No Drawing. Filed July 8, 1968, Ser. No. 743,008
Int. Cl. A23g 5/00
U.S. Cl. 426—164                                           3 Claims

ABSTRACT OF THE DISCLOSURE

Stabilizer systems for frozen confections provide enhanced desirable effects without the disadvantage of a substantial increase in liquid mix viscosity by using stabilizers such as guar gum, locust bean gum, sodium carboxymethylcellulose and mixtures thereof coated with an ester emulsifier composition consisting of essentially fully saturated monoglycerides together with polyoxyethylene (20) sorbitan tristearate or polyoxyethylene (20) sorbitan monooleate or mixtures thereof. The emulsifier system coating the gum also acts to provide emulsifier function in the mix.

---

This invention relates to the manufacture of frozen emulsion confections and, more particularly, to stabilizer systems for producing such confections of improved quality with rapidity and efficiency.

Commercially processed frozen confections such as soft serve ice milk, hard ice milk and ice cream generally consist of lacteal, homogenized, oil-in-water emulsions which include butterfat, no-fat milk solids, sugars, flavoring material, an emulsifier system, and a stabilizer system. The emulsifier system serves to stabilize the emulsion before freezing, improve whipping ability, shorten the time required to introduce the desired amount of air, and produce a smoother, drier texture in the finished product. The principal function of the emulsifier system in accomplishing the above involves agglomeration control over the dispersed fat globules in the emulsion. Emulsifiers in common commercial use for these products include mono and diglycerides, polyoxyethylene (20) sorbitan monooleate, and polyoxyethylene (20) sorbitan tristearate.

Stabilizer systems are used to improve smoothness, texture, body and storage stability. Stabilizers function primarily to inhibit the growth of ice crystals at make up and under conditions of "heat shock," that is, a partial warming of the frozen product followed by a return to more normal storage temperatures which tends to produce a gritty texture. Common commercial stabilizers for frozen confections include sodium carboxymethylcellulose, Irish moss, guar gum and locust bean gums.

In practice, the viscosity of frozen confection liquid mix is known to be related to the level of stabilizer used, that is, increased levels generally result in increased mix viscosity. A thick or high viscosity mix has thus become an expected characteristic for a superior frozen product. However, high viscosity mixes are not conducive to rapid, efficient handling, are difficult to make up, tend to "burn on" (stick to a hot surface forming a crust with modern high temperature, short-time pasteurization methods) and are difficult to cool effectively prior to freezing. It has, therefore, been necessary to limit the level of stabilizers employed so that efficient handling or "throughput" may be achieved. A compromise has developed whereby stabilizer usage is limited below the optimimum product improvement level by production considerations and it is apparent that any practice which results in enhanced stabilizer function without excessively increasing mix viscosity is highly desirable in facilitating the preparation of high quality frozen confections.

In accordance with this invention, it has been found that certain ester emulsifier combinations processed to provide a homogeneous coating on the particles of certain stabilizers used in a frozen confection mix produces enhanced stabilizer function without undesirable increases in mix viscosity. An additional advantage of this invention arises from the fact that the agents used in treating the stabilizers are themselves active emulsifier ingredients in the mix, providing a total, synergistic, additive system for the efficient production of high quality frozen confections.

The principal objects of the present invention are: to provide a frozen confection stabilizer system which produces improved texture, body, extended storage stability and resistance to heat shock in frozen confections without also producing undesirably high viscosity in the liquid mix predecessor; to provide a synergistic additive system for manufacturing frozen confections which includes both stabilizers and emulsifiers; and to provide such an additive composition and method which are well adapted for continuous commercial manufacturing processes.

Other objects and advantages of this invention will become apparent from the following description wherein is set forth by way of example certain embodiments of this invention.

The emulsifier combinations used in the practice of this invention comprise essentially fully saturated monoglycerides, both the molecularly distilled type and reaction mixtures of mono, di and triglyceride, together with polyoxyethylene (20) sorbitan tristearate and/or polyoxyethylene (20) sorbitan monooleate. The distilled saturated monoglycerides are preferred due to the higher concentration of the more functional alpha ester of glycerol.

Stabilizing gums which have been found responsive to treatment in accordance with this invention are: guar gum, locust bean gum, sodium carboxymethylcellulose, and mixtures thereof.

It has heretofore been known in the frozen confection art that carboxymethylcellulose will go into solution more rapidly when the gum is coated with a mono or diglyceride of a higher fatty acid or a mixed diglyceride of a higher fatty acid and an aromatic carboxylic acid (see U.S. Pat. No. 2,445,226). To applicant's knowledge, however, no mix or final product improvement has been noted over the use of uncoated carboxymethylcellulose.

Functional coating mixtures of the emulsifier, in accordance with this invention, may vary from about 15% by weight to about 50% of the stabilizer depending upn the granulation and type of gum to be treated. Generally a level of 30% by weight of emulsifier to stabilizer has been found to be preferred.

Workable ratios of monoglyceride to sorbitan esters vary with the specific products employed. For example, when using only polyoxyethylene (20) sorbitan monooleate, treatment can be achieved with combinations containing from about ten parts low iodine value monoglyceride for each part of sorbitan ester, to about two parts monoglyceride ester for each part sorbitan ester. Generally, best results are achieved with a mixture of 3.5 parts distilled saturated monoglyceride having an iodine value of less than 5, and one part polyoxyethylene (20) sorbitan monooleate. When polyoxyethylene (20) sorbitan tristearate, which is a paste at room temperature, is used, optimum treatment generally results from a combination of two parts saturated monoglyceride for each part of the sorbitan ester, however, the ratio may be as low as one to one.

The lipid materials are rendered homogeneous prior to use preferably by melting together the total lipid mix by heating to a temperature slightly in excess of the hard monoglyceride melting point to assure uniformity of the mixture. It is noted that Irish moss, also termed carrageen, is normally used at a low level to stabilize frozen confection mix against a physical separation with storage, called "whey off." The treatment of gums in the manner of this invention has been found to inhibit the intended carrageen technical effect and, therefore, carrageen is introduced into the total system separately.

The examples below illustrate the practice of this invention.

EXAMPLE I

Myverol 1800, a distilled fully saturated monoglyceride, marketed by Distillation Products Industries, having 90.5 percent alpha monoester and Tween 80, a polyoxyethylene (20) sorbitan monooleate marketed by Atlas Chemical Company, were melted together to a temperature of 72° C. with constant agitation in a double arm mixer. Following five minutes mixing after all the gum was introduced, a soft aerated dough-like mass resulted. Heating was discontinued and the product was allowed to cool, with constant mixing, to 37.5° C. Carrageen was then added to the homogeneous powdered coated gum. The total was sifted and found to contain no particles larger than about 420 microns. The finished stabilizer-emulsifier product was coded 1–A and contained the following ratio of ingredients:

| Ingredients: | Parts by weight |
| --- | --- |
| Myverol 1800 | 22 |
| Tween 80 | 6 |
| Locust bean gum | 64 |
| Carrageen | 8 |

Using the above method, two additional preparations were made up using the identical ingredients but coating the gum with only one of the two lipids. Locust bean gum coated with mono only as coded 1–B and the gum treated with Tween 80 only was coded 1–C.

Comparative evaluation of these products was carried out with the following typical ice cream formula. In all test mixes the total level of monoglyceride, Tween 80, and gum was the same.

| Ingredients: | Parts by weight |
| --- | --- |
| Butterfat | 10.23 |
| Milk solids non-fat | 12.52 |
| Sugar solids | 16.00 |
| Test additive | 0.20 |
| Moisture, balance to total 100. | |

Following make up, the test mixes were vat pasteurized at 160° F. for 30 minutes, homogenized at 2500 p.s.i., and cooled over a cold water surface type cooler to 40° F. Viscosity of the fresh mix was recorded with a model RVF Brookfield Viscometer equipped with a No. 1 spindle at 20 RPM. Following storage at 37° F. for 24 hours, viscosity was again measured and recorded. A model 50–B, 5-quart Electro Freezer was used with draw at 21°F. Overrun and dryness were evaluated at draw.

The freshly frozen mix was judged for dryness by rating "1" for very dry, "2" for a state normally considered satisfactory, and "3" for definitely "wet" in appearance. The ice cream was packed in one-pint containers and hardened at −15° F. for 24 hours. After storage of 1, 2, and 14 days, samples were rated subjectively and coded by a panel of experts as to relative body and texture. Results follow:

| Pre-treatment variable | Mix viscosity | | Over-run, percent | Dryness rating | Relative quality rating |
| --- | --- | --- | --- | --- | --- |
| | Fresh (cps.) | 24 hours (cps.) | | | |
| 1–A | 160 | 188 | 65 | 1 | First. |
| 1–B | 170 | 198 | 61 | 2 | Second. |
| 1–C | 172 | 200 | 63 | 2 | Third. |

The three mixes did not vary significantly in viscosity or overrun. However, product 1–A, resulting from the practice of this invention, showed significant improvement in dryness at the freezer and superior quality factors associated with high levels of gum usage. The quality rating evaluations after various storage periods all resulted in the same relative ranking of the samples but it was noted that the superiority of ice cream made with the 1–A mix became more obvious with increased storage time. Thus it was demonstrated that pre-treatment of locust bean gum with the combination lipid resulted in material improvements.

EXAMPLE II

The make up method and evaluation as described in Example I was repeated for a second series of tests with the following variations in formulation:

2–D Tween 65, Atlas Chemical Co., (polyoxyethylene (20) sorbitan tristearate) replaced Tween 80.
2–E Monoglyceride was added directly and the gum was treated with 6% Tween 65 only.
2–F Atoms 150, Atlas Chemical Co., saturated monoglyceride reaction product containing 55% alpha ester replaced Myverol 1800.
2–G Locust bean gum treated with Atoms 150 only, Tween 80 being added to the mix at pasteurization.

The results were as follows:

TABLE II

| Pre-treatment variable | Mix viscosity | | Over-run, percent | Dryness rating | Relative quality rating |
| --- | --- | --- | --- | --- | --- |
| | Fresh (cps.) | 24 hours (cps.) | | | |
| 2–D | 170 | 200 | 72 | 1 | First. |
| 2–E | 188 | 204 | 73 | 2 | Third. |
| 2–F | 184 | 208 | 71 | 1.5 | Second. |
| 2–G | 190 | 218 | 65 | 2 | Fourth. |

The two agents of the present invention, 2–D and 2–F produced significantly improved dryness, body and texture. The improved quality of 2–D and 2–F ice cream became more obvious with storage.

EXAMPLE III

The make up and evaluation detailed in Examples I and II were again employed but with substitution of Super Col G, General Mills, guar gum for locust gum in each composition. The rsults of this series follow in Tables III A and III B.

TABLE III A

| Pre-treatment variable | Mix viscosity | | Over-run, percent | Dryness rating | Relative quality rating |
| --- | --- | --- | --- | --- | --- |
| | Fresh (cps.) | 24 hours (cps.) | | | |
| 3–A | 168 | 225 | 75 | 1 | First. |
| 3–B | 170 | 232 | 70 | 2 | Second. |
| 3–C | 160 | 220 | 73 | 2 | Third. |

As with locust gum, the combination agent treatment resulted in significantly improved results compared to treatment with either lipid alone, and quality improvement was shown as not associated with higher mix viscosity.

TABLE III B

| Pre-treatment variable | Mix viscosity | | Over-run, percent | Dryness rating | Relative quality rating |
| --- | --- | --- | --- | --- | --- |
| | Fresh (cps.) | 24 hours (cps.) | | | |
| 3–D | 172 | 245 | 73 | 1 | First. |
| 3–E | 182 | 240 | 74 | 2 | Third. |
| 3–F | 172 | 248 | 71 | 1 | Second. |
| 3–G | 184 | 256 | 70 | 2 | Fourth. |

Results are very similar to those shown in Example II with the combination pre-treatment yielding superior results.

EXAMPLE IV

A further demonstration was carried out using one lot of 7HF, Hercules Powder Co., sodium carboxymethylcellulose gum (CMC) and the preparation and test method described in Example I. When only one lipid was used for treatment, the correct level of the second emulsifier was introduced into the ice cream mix prior to pasteurization. The following test series was prepared.

Preparation Code:                      Identification
- 4–A                No gum treatment
- 4–B                CMC treated with Myverol 1800 only
- 4–C                CMC treated with Tween 80 only
- 4–D                CMC treated with Myverol 1800 and Tween 80

Results are as follows:

TABLE IV

| Pre-treatment variable | Mix viscosity | | Over-run, percent | Dry-ness rating | Relative quality rating |
|---|---|---|---|---|---|
| | Fresh (cps.) | 24 hours (cps.) | | | |
| 4–A | 312 | 362 | 50 | 2 | Fourth. |
| 4–B | 280 | 336 | 55 | 1.5 | Second. |
| 4–C | 318 | 368 | 56 | 2 | Third. |
| 4–D | 315 | 365 | 54 | 1 | First. |

Pre-treatment of CMC with Tween only had little effect on the quality of the finished ice cream. The gum treated with monoglyceride only indicated some improvement but was clearly inferior to the gum pre-treated with the combination as described. As shown in previous examples, the improvements in body and texture normally associated with stabilizer gum usage were significantly improved without a corresponding increase in mix viscosity.

EXAMPLE V

The materials, methods, and evaluation procedures detailed in Example I were used to facilitate the comparison of treated and untreated additives using a combination of gums. The additive formulation in this case was as follows:

| | Percent |
|---|---|
| Myverol 1800 | 22.0 |
| Tween 80 | 6.0 |
| Locust bean gum | 39.0 |
| Guar gum | 25.0 |
| Carrageen | 8.0 |
| | 100.0 |

The coated preparation was coded 5–A and the control 5–B. Both preparations were used in the afore described ice cream formulation at 0.2%. Results of evaluation are recorded in Table V.

TABLE V

| Variable | Mix viscosity | | Over-run, percent | Dry-ness rating | Relative quality rating |
|---|---|---|---|---|---|
| | Fresh (cps.) | 24 hours (cps.) | | | |
| 5–A—Treated | 162 | 210 | 65 | 1 | First. |
| 5–B—Untreated | 162 | 200 | 64 | 2 | Second. |

Quality improvement associated with pre-treatment of the combination gum system was quite clear.

EXAMPLE VI

Using the preparation method and evaluation procedures detailed in Example I, gum treatments varying in ratio of monoglyceride to Tween 80 and treatment level were prepared and evaluated together with untreated preparations of the same formulation.

The additive formulations were as follows:

| Preparation code | Percent | | | | |
|---|---|---|---|---|---|
| | 6–A | 6–B | 6–C | 6–D | 6–E |
| Myverol 1800 | 10.0 | 20.0 | 22.0 | 32.0 | 38.0 |
| Tween 80 | 5.0 | 8.0 | 6.0 | 4.0 | 8.0 |
| Guar gum | 25.0 | 25.0 | 23.75 | 21.0 | 20.0 |
| Locust gum | 39.0 | 39.0 | 37.05 | 35.0 | 26.0 |
| Carrageen (filler) | 8.0 | 8.0 | 8.0 | 8.0 | 8.0 |
| Powdered sucrose | 13.0 | | 3.2 | | |
| Mono/Tween ratio | 2/1 | 2.5/1 | 3.7/1 | 8/1 | 4.75/1 |
| Percent gum treatment | 19 | 30.5 | 31.5 | 39.1 | 50.0 |

Usage level and results of comparison of these various pre-treated preparations with the control series are recorded in Table VI. In each case the relative quality of the finished confection produced with the control and pre-treated sample was compared directly. All ingredients used were from one production lot.

TABLE VI

| Test additive | Percent used | Mix viscosity | | Over-run, percent | Dryness rating | Relative quality rating |
|---|---|---|---|---|---|---|
| | | Fresh (cps.) | 24 hours (cps.) | | | |
| 6–A | 0.2 | 178 | 214 | 60 | 1.5 | First. |
| Control | 0.2 | 182 | 232 | 67 | 2.0 | Second. |
| 6–B | 0.2 | 104 | 218 | 71 | 1.0 | First. |
| Control | 0.2 | 112 | 206 | 73 | 1.5 | Second. |
| 6–C | 0.2 | 114 | 190 | 62 | 1.5 | First. |
| Control | 0.2 | 111 | 187 | 65 | 1.5 | Second. |
| 6–D | 0.15 | 70 | 82 | 67 | 1.5 | First. |
| Control | 0.15 | 66 | 81 | 68 | 2.0 | Second. |
| 6–E | 0.2 | 110 | 140 | 73 | 1.0 | First. |
| Control | 0.2 | 105 | 135 | 76 | 1.0 | Second. |

These data demonstrate that the ice cream made with the pre-treated additive was consistently superior to the control in body, texture, and smoothness throughout the test period without significant viscosity variations.

EXAMPLE VII

A typical formula for soft serve ice milk was used to compare pre-treated and control additives according to this invention.

| Formula: | Parts by weight |
|---|---|
| Butterfat | 4.46 |
| Milk solids non-fat | 13.08 |
| Sugar solids | 13.00 |
| Test additive | 0.38 |
| Moisture, balance to total 100. | |

The additive formulation used was as follows. Materials used in preparation of both additives were from one lot.

| | Parts by Weight |
|---|---|
| Monoglyceride | 22.0 |
| Tween 80 | 6.0 |
| Locust gum | 39.0 |
| Guar gum | 25.0 |
| Carrageen | 8.0 |

The make up procedure used was the same as detailed in Example I, except the freezer used was a Model 5 P. A Port Morris Electro Freeze soft serve freezer was used for freezing the stored mix and ratings relating to body, texture and stiffness of the product were evaluated immediately after freezing. Data tabulated in this test are recorded in Table VII.

TABLE VII

| Additive | Mix viscosity | | Over-run, percent | Dry-ness rating | Relative quality rating |
|---|---|---|---|---|---|
| | Fresh (cps.) | 24 hours (cps.) | | | |
| Pre-treated | 300 | 369 | 55 | 1 | First. |
| Control | 310 | 367 | 52 | 2 | Second. |

Improvements in the finished sort serve product made with the coated gum preparation were outstanding. Dryness was improved and smoothness, body, and stability were notably superior to the product resulting from addition of the same ingredients added in the usual manner, and yet there was no substantial variation in mix viscosities.

EXAMPLE VIII

The preparations used in Example VII were evaluated again using an ice milk formulation.

| Formula: | Parts by Weight |
|---|---|
| Butterfat | 4.23 |
| Milk solids non-fat | 12.99 |
| Sugar solids | 17.00 |
| Test additive | 0.20 |
| Moisture, balance to a total of 100. | |

Table VIII shows the results of this evaluation.

TABLE VIII

| Variable | Mix viscosity | | Over-run, percent | Dry-ness rating | Relative quality rating |
|---|---|---|---|---|---|
| | Fresh (cps.) | 24 hours (cps.) | | | |
| Pre-treated | 258 | 336 | 63 | 1 | First. |
| Control | 255 | 333 | 65 | 2 | Second |

Again, even though mix viscosity did not vary to a significant degree, the resultant ice milk was consistently superior in body, texture, smoothness and storage stability. As with ice cream, the variation in relative quality became greater with longer storage life and heat shock.

EXAMPLE IX

To further demonstrate improvements associated with treating gums according to this invention, a series of total additives were prepared for comparison with preparation 5-A treated and 5-B untreated control used in Example V. All ingredients used in the additives and ice cream mix were from one lot. Emulsifier level was held constant and the amount of combination gum increased. The results of this test, together with the specific identification of the additive variable included in the mix, are recorded in Table IX.

TABLE IX

| Variable | Mix viscosity | | Over-run, percent | Dry-ness rating | Relative quality rating |
|---|---|---|---|---|---|
| | Fresh (cps.) | 24 hours (cps.) | | | |
| 5-A treated | 186 | 244 | 62 | 1.0 | First. |
| 5-B untreated | | | | | |
| Control | 182 | 240 | 63 | 1.5 | Third. |
| 5% added: All untreated. | 188 | 254 | 62 | 1.0 | Second. |
| 10% added: All untreated. | 212 | 270 | 67 | 1.0 | First.[1] |
| 15% added: All untreated. | 252 | 304 | 58 | 1.0 | Fourth. |

[1] Same as 5-A.

These data show that the improved technical effect associated with pre-treatment of gums according to this invention may be achieved with untreated gum by introduction of close to 10 percent added material in the mix. This addition, however, does significantly alter the mix viscosity. The use of 15 percent additional gums was rated poor due to over-stabilization.

Although certain forms of this invention have been illustrated and described, it is not to be limited thereto except insofar as such limitations are included in the following claims:

What is claimed and desired to secure by Letters Patent is:

1. A stabilizer system for producing, in frozen confections, both emulsifier and improved stabilizer characteristics without materially increasing viscosity in the confection mix, comprising:
   (a) a stabilizing gum selected from the group consisting of guar gum, locust bean gum, sodium carboxymethylcellulose and mixtures thereof coated with
   (b) an emulsifier consisting of essentially fully saturated monoglycerides together with a member of the group consisting of polyoxyethylene (20) sorbitan tristerate and polyoxyethylene (20) sorbitan monooleate and mixtures thereof,
   (c) said emulsifier being included in the system in an amount equal to between about 15% to 50% by weight of said stabilizing gum,
   (d) the ratio of monoglycerides to sorbitan ester being between about 10 to 1 and 1 to 1 by weight.

2. The stabilizer system as set forth in Claim 1 wherein:
   (a) said emulsifier is included in the system in an amount equal to about 30% by weight of said stabilizing gum.

3. The stabilizer system as set forth in Claim 1 wherein:
   (a) said monoglycerides are molecularly distilled.

References Cited
UNITED STATES PATENTS

| | | | |
|---|---|---|---|
| 2,445,226 | 7/1948 | Landers | 99—136 XV |
| 2,493,324 | 1/1950 | Steiner et al. | 99—136 |
| 2,935,406 | 5/1960 | Miller | 99—136 |
| 3,124,464 | 3/1964 | Knightly et al. | 99—136 |

A. LOUIS MONACELL, Primary Examiner

J. M. HUNTER, Assistant Examiner